Patented Sept. 1, 1953

2,650,940

UNITED STATES PATENT OFFICE 2,650,940

MANUFACTURE OF GLYCOLS

Donald Peter Young, Sanderstead, England, assignor to The Distillers Company Limited, Edinburgh, Scotland, a British company No Drawing. Application February 23, 1951, Serial No. 212,479. In Great Britain March 11, 1950

8 Claims. (Cl. 260—618)

The present invention refers to the conversion of epoxides into the corresponding glycols and relates in particular to the treatment of terminal epoxides having four or more carbon atoms in the molecule.

Attempts to convert a number of epoxides into the corresponding glycols by the customary methods such as treatment with water in the presence of an acidic catalyst or metallic oxides have failed because the said epoxides are easily isomerised by even small quantities of such acidic catalysts into the corresponding aldehydes, unsaturated alcohols and other undesired products. This is frequently the case with epoxides which contain more than two carbon atoms in the chain, and in which the epoxide group is attached to carbon atoms in the 1:2 or terminal position.

The present invention has as its object the conversion of 1:2-epoxides of the general formula

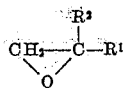

in which $R^1$ is selected from the group consisting of an alkyl, aryl and an alicyclic hydrocarbon radical, and $R^2$ is selected from the group consisting of a hydrogen atom, an alkyl, aryl and an alicyclic hydrocarbon radical, into the corresponding glycols and the hydration of such epoxides which cannot be satisfactorily hydrated in acidic or neutral solutions. The alkyl groups in the above formula may be for instance methyl, ethyl, propyl, butyl, isobutyl, beta-di-isobutyl, neopentyl or amyl groups; the aryl radical may be a phenyl or naphthyl group and the alicyclic hydrocarbon may be, for instance, the cyclohexene radical. It is a further object of the invention to convert said epoxides into glycols with good yields and with less by-product formation than is usual in acid conditions.

According to this invention an epoxide as defined above is heated in intimate contact with aqueous alkali to an elevated temperature whereby the corresponding glycol is produced. Suitable temperatures are, for instance, from 90° to 200° C. and preferably from 150° to 200° C. In order to obtain intimate contact of the epoxide with the aqueous alkaline solution, the treatment may be carried out with constant mixing of the reaction mixture components or it may be carried out by the addition to the reaction mixture of a mutual solvent, such as a suitable aliphatic alcohol. The process may be operated either in batches or continuosly. The concentration of alkali in the reaction mixture should preferably be sufficient to maintain a pH of more than 12, and preferably of between 12 to 13, and a considerable excess of water over the epoxide is desirable.

Alkalis which may be employed are sodium hydroxide, potassium hydroxide, barium hydroxide, sodium carbonate and potassium carbonate. Sodium bicarbonate may also be employed, since under the reaction conditions it decomposes into sodium carbonate. As mutual solvents for the epoxide and the aqueous alkali, aliphatic alcohols such as ethanol, propanol or butanol may be used.

The glycol produced may be separated from the reaction mixture by any suitable means, for example by filtration or extraction. When alcohols have been used as solvents during the reaction it is convenient to remove these alcohols first, for instance by distillation. In the case that the reaction is carried out in the absence of a mutual solvent, after the glycol has been separated from the mixture, for instance by filtration, the aqueous phase containing alkali and unseparated glycol may be recycled.

1:2-epoxides or terminal epoxides which may be treated according to the invention are, for instance, 1:2-epoxy-2:4:4-trimethylpentane, the epoxides derived from the co-dimer of n-butene and isobutene and tri-isobutylene, styrene (1:2-epoxy-1-phenylethane), alpha-methyl styrene, and alpha-ethyl styrene. These epoxides are readily obtained by the oxidation with air, for instance of di-isobutylene, tri-isobutylene, the codimer of n-butene and isobutene, or styrene and alpha-methyl styrene respectively, by the process of the copending U. S. Serial No. 149,642, dated March 14, 1950, and now abandoned, and the process of the present invention thus allows the preparation of valuable glycols from easily accessible material.

The following examples illustrate the manner in which the process of the invention may be carried out in practice. By replacing the epoxides named therein by corresponding quantities of those epoxides which are not specifically exemplified, for instance vinylcyclohexene epoxide, they are converted into the corresponding glycols in a similar way.

Example 1

64 grams of 1:2-epoxy-2:4:4-trimethylpentane was heated with a solution of 8 grams of sodium hydroxide in 200 ccs. of water for 5 hours at 175° C. in an autoclave with a reciprocating stirrer. The upper layer on distillation gave 47.4 grams of 2:4:4-trimethylpentane-1:2 diol. Substantially no higher-boiling material was formed. The aqueous layer was returned to the autoclave, after suitable make-up to the original strength and volume, and used to hydrate a further 64 grams of epoxide under the same conditions, and another 56 grams of diol was thereby obtained.

Example 2

64 grams of 1:2-epoxy-2:4:4-trimethylpentane was heated at 175° C. for 3 hours, with a solution of 21 grams of sodium carbonate in 200 ccs. of water, as described in Example 1. The upper layer on distillation afforded 3.1 grams of unchanged epoxide and 51.1 grams of diol.

Example 3

6 grams of 1:2-epoxy-1-phenylethane (styrene oxide) was heated in a closed tube with 10 ccs. of water and 0.4 gram of sodium hydroxide for 3 hours at 175° C. The upper layer was extracted into ether, and after washing, drying and removal of solvent, there was obtained 2.2 grams of 1-phenylethane-1:2-dol, B. P. 155–165° C./10 mm., M. P. 62–64° C.

Example 4

22 grams of a fraction, B. P. 82–85° C./85 mm., obtained from the oxidation of n-butene-isobutene "codimer" according to the copending U. S. Serial No. 149,642, dated March 14, 1950, and containing 45% of $C_8$ epoxides by titration, was heated at 200° C. for 5 hours, with 4 grams of sodium hydroxide in 100 ccs. of water as described in Example 1. The co-dimer prepared in accordance with application Ser. No. 149,642 was made as follows:

Octenes were obtained by condensing isobutylene with n-butenes at about 160° C. and 80 ats. pressure in the presence of a phosphate catalyst and collecting the liquid fraction boiling between 100.5 and 120° C. at 760 mm. Hg. This fraction had a bromine number of 175, a specific gravity of 0.7300 at 60° F. and, according to infrared analysis, contained, apart from other $C_8$ olefine, 60% as 2:3:4-trimethylpentene-1. 1008 grams of this co-dimer and 27 grams magnesium oxide containing 1 gram of cobalt naphthenate were vigorously stirred at 90° C., whilst gaseous oxygen was introduced. Within 9 hours, oxygen equal to 100.65 litres at standard temperature and pressure had been absorbed, after which time the reaction was stopped. The reaction product contained then 14.0% $C_8$-epoxide, as determined by the ether-HCl method.

The oil layer was fractionally distilled. After the low-boiling fractions, which included some acetone, ethylalcohol, tert-butanol and small amounts of other materials, and isopropanol, and the unchanged starting material (about 300 grams) had been distilled off at normal pressure, most of the epoxide compounds were collected in a fraction boiling between 72–85° C./85 mms. mainly at 82–85° C./85 mm. Hg.

Part of this fraction (100 grams) was passed over 44 grams activated alumina at 250° C. with a contact time of 8.9 secs. when the epoxide was converted to a mixture of $C_8$ ketones and aldehydes. From the product was obtained 3.5 grams of a fraction, B. P. 80–94° C./10 mm., which contained 46% of $C_8$-glycols by titration.

Example 5

16.5 grams of an oxidate obtained from alphamethyl styrene by the procedure of the copending U. S. Serial No. 149,642 dated March 14, 1950, and consisting of 55% of 1:2-epoxy-2-phenyl-propane and the residue mainly of acetophenone, was heated at 200° C. for 4½ hours with 2.8 grams of sodium hydroxide in 70 ccs. of water, as in Example 1. The oxidate from alpha-methyl styrene was prepared as follows:

236 grams of alphamethylstyrene was oxidized with gaseous oxygen in the presence of magnesium oxide and a trace of cobalt naphthenate at 110° C. and atmospheric pressure. 21.24 litres (S. T. P.) of oxygen was absorbed within 2¾ hours after which time the reaction was stopped. The pH of the reaction mixture throughout the oxidation was about 8.5. The oil was separated from the excess of magnesium oxide and magnesium salts and then fractionally distilled. After removal of unchanged methylstyrene, a fraction boiling at 79.5–83° C./13 mm. was collected, which contained 45.9% methylstyrene epoxide and 40.8% acetophenone. In the higher boiling fractions (86–114° C./13 mm. Hg) phenyl-methyl-acetaldehyde, the isomer of methylstyrene oxide, was found to be present.

Oxidation of methylstyrene in the absence of magnesium oxide, i. e. at a pH much lower than 6, results in almost exclusive formation of acetophenone and formaldehyde, at the same time of contact. From distillation of the product was obtained 1.7 grams of 2-phenyl-propane-1:2-diol, B. P. 144–150° C./10 mm., M. P. 44–46° C.

I claim:

1. Process for the manufacture of glycols which comprises heating an epoxide of the general formula

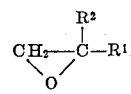

in which $R^1$ is selected from the group consisting of an alkyl, aryl and an alicyclic hydrocarbon radical, and $R^2$ is selected from the group consisting of a hydrogen atom, an alkyl, aryl and an alicyclic hydrocarbon radical, in intimate contact with an aqueous alkaline solution to temperatures between 90° and 200° C.

2. Process as set forth in claim 1, wherein the temperature is between 150° and 200° C.

3. Process according to claim 1, wherein the reaction mixture contains a mutual solvent for the epoxide and the aqueous alkali.

4. Process as claimed in claim 1, wherein the pH in the aqueous solution is maintained at 12 or more.

5. Process for the manufacture of 2:4:4-trimethyl-pentan-1:2-diol which comprises heating 1:2-epoxy-2:4:4-trimethylpentane in a closed vessel in intimate contact with an aqueous alkaline solution to a temperature between 150° and 200° C.

6. Process as claimed in claim 5, wherein the pH in the reaction mixture is maintained at 12 and higher.

7. Process for the manufacture of 1-phenylethane-1:2-diol which comprises heating 1:2-epoxy-1-phenylethane in a closed vessel in intimate contact with an aqueous alkaline solution to a temperature between 90° and 200° C.

8. A process for manufacture of 2 phenyl propane 1:2 diol which comprises heating 1:2-diol which comprises heating 1:2-epoxy-2-phenyl-propane in intimate contact with an aqueous alkaline solution to a temperature of the order of 200° C.

DONALD PETER YOUNG.

References Cited in the file of this patent

UNITED STATES PATENTS

| Number | Name | Date |
| --- | --- | --- |
| 2,135,271 | Balcar | Nov. 1, 1938 |

OTHER REFERENCES

Byers, Jour. Chem. Soc. (British), pages 1328–1331 (1948).